(12) United States Patent
Bush et al.

(10) Patent No.: US 7,904,712 B2
(45) Date of Patent: Mar. 8, 2011

(54) SERVICE LICENSING AND MAINTENANCE FOR NETWORKS

(75) Inventors: Steve M. Bush, Redmond, WA (US); Dan R. Kerns, Mercer Island, WA (US); Thomas C. Butcher, Seattle, WA (US); Harry J. Heymann, Greenville, SC (US); Roxanne C. Skelly, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 1070 days.

(21) Appl. No.: 10/916,642

(22) Filed: Aug. 10, 2004
(Under 37 CFR 1.47)

(65) Prior Publication Data

US 2006/0036847 A1     Feb. 16, 2006

(51) Int. Cl.
*H04L 29/06*     (2006.01)
(52) U.S. Cl. .......................... 713/153; 726/3; 726/12
(58) Field of Classification Search .................. 713/153; 726/3, 12
See application file for complete search history.

(56) References Cited

U.S. PATENT DOCUMENTS

| | | | |
|---|---|---|---|
| 5,383,178 A | 1/1995 | Unverrich | |
| 5,396,485 A | 3/1995 | Ohno et al. | |
| 5,768,483 A | 6/1998 | Maniwa et al. | |
| 5,774,667 A | 6/1998 | Garvey et al. | |
| 5,974,237 A | 10/1999 | Shurmer et al. | |
| 5,978,568 A | 11/1999 | Abraham et al. | |
| 6,006,272 A * | 12/1999 | Aravamudan et al. | 709/245 |
| 6,023,723 A | 2/2000 | McCormick et al. | |

(Continued)

FOREIGN PATENT DOCUMENTS

JP     2001-222497 A     8/2001

(Continued)

OTHER PUBLICATIONS

PCT Notification of the International Search Report and the Written Opinion of the International Searching Authority, or the Declaration, International Application No. PCT/US2008/063318, mailed Sep. 25, 2008, 6 pgs.

(Continued)

*Primary Examiner* — Kambiz Zand
*Assistant Examiner* — Amare Tabor
(74) *Attorney, Agent, or Firm* — Patent Capital Group

(57) ABSTRACT

A technique is disclosed that allows different computers in a network to create an identifier that uniquely identifies the network. The technique allows the unique identifier to be consistently created over time, regardless of the particular make up of the computing devices in the network at any particular point time. In some implementation, a computer within the network hosts the identification creation tool. In order to create a unique identifier for the network, the tool identifies each network adapter used by the host computer. Using this information, the tool identifies a gateway device used by the network adapter or adapters, and then determines the physical network address of that gateway device. For example, if the network is an Ethernet network, the tool will determine the medial access control (MAC) address for the gateway device. The tool then creates a unique identifier for the network based upon the physical address. The unique network identifier can then be used to associate the billing a usage fee, such as a licensing fee, with the network rather than with an individual computer within the network. Alternately or additionally, the unique network identifier can be used to maintain and support the gateway device for the network.

23 Claims, 9 Drawing Sheets

U.S. PATENT DOCUMENTS

| | | |
|---|---|---|
| 6,456,306 B1 | 9/2002 | Chin et al. |
| 6,530,018 B2 | 3/2003 | Fleming |
| 6,584,074 B1 | 6/2003 | Vasamsetti et al. |
| 6,631,118 B1 | 10/2003 | Jones |
| 6,678,250 B1 | 1/2004 | Grabelsky et al. |
| 6,728,262 B1 | 4/2004 | Woram |
| 6,778,505 B1 | 8/2004 | Bullman et al. |
| 6,801,941 B1 * | 10/2004 | Stephens et al. ............... 709/225 |
| 6,892,245 B1 | 5/2005 | Crump et al. |
| 6,954,785 B1 | 10/2005 | Martin et al. |
| 6,965,614 B1 | 11/2005 | Osterhout et al. |
| 6,980,556 B2 | 12/2005 | Vimpari |
| 7,020,701 B1 | 3/2006 | Gelvin et al. |
| 7,020,720 B1 | 3/2006 | Donahue et al. |
| 7,027,808 B2 | 4/2006 | Wesby |
| 7,080,141 B1 | 7/2006 | Baekelmans et al. |
| 7,111,054 B2 | 9/2006 | Lo |
| 7,155,493 B1 | 12/2006 | Weber |
| 7,177,957 B2 | 2/2007 | Vance |
| 7,200,551 B1 * | 4/2007 | Senez ............................. 705/40 |
| 7,240,106 B2 | 7/2007 | Cochran et al. |
| 7,249,171 B2 | 7/2007 | Goto |
| 7,269,653 B2 | 9/2007 | Mentze et al. |
| 7,283,517 B2 * | 10/2007 | Yan et al. ....................... 370/352 |
| 7,319,873 B2 | 1/2008 | Zhang et al. |
| 7,337,910 B2 | 3/2008 | Cartmell et al. |
| 7,340,512 B2 | 3/2008 | Cochran et al. |
| 7,388,839 B2 | 6/2008 | Chafle et al. |
| 7,392,310 B2 | 6/2008 | Motoyama et al. |
| 7,418,702 B2 | 8/2008 | Tsao |
| 7,421,466 B2 | 9/2008 | Haines |
| 7,457,737 B2 | 11/2008 | Patiejunas |
| 7,460,546 B2 | 12/2008 | Anderson, IV |
| 7,475,133 B2 | 1/2009 | Nuggehalli |
| 7,496,660 B2 | 2/2009 | Blaisdell et al. |
| 7,499,999 B2 | 3/2009 | Ocepek et al. |
| 7,509,415 B2 | 3/2009 | Baekelmans et al. |
| 7,545,762 B1 | 6/2009 | McConnell et al. |
| 7,565,418 B2 | 7/2009 | Marl et al. |
| 7,581,039 B2 | 8/2009 | Martinez et al. |
| 7,603,710 B2 | 10/2009 | Harvey et al. |
| 7,657,612 B2 | 2/2010 | Manchester et al. |
| 7,769,409 B2 | 8/2010 | Harris et al. |
| 2001/0039580 A1 | 11/2001 | Walker et al. |
| 2002/0004935 A1 | 1/2002 | Huotari et al. |
| 2002/0010866 A1 | 1/2002 | McCullough et al. |
| 2002/0026503 A1 | 2/2002 | Bendinelli et al. |
| 2002/0026505 A1 | 2/2002 | Terry |
| 2002/0112076 A1 * | 8/2002 | Rueda et al. .................. 709/245 |
| 2002/0116544 A1 | 8/2002 | Barnard et al. |
| 2002/0147938 A1 | 10/2002 | Hamilton et al. |
| 2002/0161865 A1 | 10/2002 | Nguyen |
| 2002/0161867 A1 | 10/2002 | Cochran et al. |
| 2002/0174207 A1 | 11/2002 | Battou |
| 2002/0196463 A1 | 12/2002 | Schlonski et al. |
| 2003/0005112 A1 | 1/2003 | Krautkremer |
| 2003/0033402 A1 | 2/2003 | Battat et al. |
| 2003/0041238 A1 * | 2/2003 | French et al. .................. 713/153 |
| 2003/0061336 A1 | 3/2003 | Van Den Bosch et al. |
| 2003/0069947 A1 | 4/2003 | Lipinski |
| 2003/0078999 A1 | 4/2003 | Lund et al. |
| 2003/0086425 A1 | 5/2003 | Bearden et al. |
| 2003/0115298 A1 | 6/2003 | Baker |
| 2003/0115314 A1 | 6/2003 | Kawashima |
| 2003/0195937 A1 | 10/2003 | Kircher et al. |
| 2003/0200303 A1 | 10/2003 | Chong |
| 2003/0200318 A1 | 10/2003 | Chen et al. |
| 2003/0229688 A1 | 12/2003 | Liang |
| 2004/0003292 A1 * | 1/2004 | Kato ............................. 713/201 |
| 2004/0030620 A1 * | 2/2004 | Benjamin et al. ............... 705/32 |
| 2004/0040023 A1 | 2/2004 | Ellis et al. |
| 2004/0064558 A1 | 4/2004 | Miyake |
| 2004/0093383 A1 | 5/2004 | Huang et al. |
| 2004/0111505 A1 | 6/2004 | Callahan et al. |
| 2004/0155899 A1 | 8/2004 | Conrad |
| 2004/0162986 A1 | 8/2004 | Metzger |
| 2004/0172469 A1 | 9/2004 | Takahashi et al. |
| 2004/0193709 A1 | 9/2004 | Selvaggi et al. |
| 2004/0199647 A1 | 10/2004 | Ramarao et al. |
| 2004/0236759 A1 | 11/2004 | Young |
| 2005/0018241 A1 | 1/2005 | Azami |
| 2005/0050189 A1 | 3/2005 | Yang |
| 2005/0063350 A1 | 3/2005 | Choudhury et al. |
| 2005/0078681 A1 | 4/2005 | Sanuki et al. |
| 2005/0086197 A1 | 4/2005 | Boubez et al. |
| 2005/0091504 A1 | 4/2005 | Shirogane |
| 2005/0114490 A1 | 5/2005 | Redlich et al. |
| 2005/0125527 A1 | 6/2005 | Lu et al. |
| 2005/0149626 A1 | 7/2005 | Manchester et al. |
| 2005/0184852 A1 | 8/2005 | Lee |
| 2005/0198274 A1 | 9/2005 | Day |
| 2005/0229238 A1 | 10/2005 | Ollis et al. |
| 2005/0234568 A1 | 10/2005 | Chung et al. |
| 2005/0234683 A1 | 10/2005 | Graves et al. |
| 2005/0235227 A1 | 10/2005 | Martineau et al. |
| 2005/0240758 A1 | 10/2005 | Lord et al. |
| 2006/0037036 A1 | 2/2006 | Min et al. |
| 2006/0101109 A1 | 5/2006 | Nishio |
| 2006/0106918 A1 | 5/2006 | Evert et al. |
| 2006/0120293 A1 | 6/2006 | Wing |
| 2006/0129664 A1 | 6/2006 | Reimert et al. |
| 2006/0153080 A1 | 7/2006 | Palm |
| 2006/0168195 A1 | 7/2006 | Maturana et al. |
| 2006/0168263 A1 | 7/2006 | Blackmore |
| 2006/0280189 A1 | 12/2006 | McRae et al. |
| 2006/0291443 A1 | 12/2006 | Harrington et al. |
| 2007/0022185 A1 | 1/2007 | Hamilton et al. |
| 2007/0058567 A1 | 3/2007 | Harrington et al. |
| 2007/0076621 A1 | 4/2007 | Malhotra et al. |
| 2007/0106768 A1 | 5/2007 | Frietsch et al. |
| 2007/0111568 A1 | 5/2007 | Ferrari et al. |
| 2007/0130286 A1 | 6/2007 | Hopmann et al. |
| 2007/0133569 A1 | 6/2007 | Lee et al. |
| 2007/0143749 A1 | 6/2007 | Date et al. |
| 2007/0204150 A1 * | 8/2007 | Jokela et al. .................. 713/161 |
| 2007/0268506 A1 | 11/2007 | Zeldin |
| 2007/0268515 A1 | 11/2007 | Freund et al. |
| 2007/0268516 A1 | 11/2007 | Bugwadia et al. |
| 2008/0037552 A1 | 2/2008 | Dos Remedios et al. |
| 2008/0049779 A1 | 2/2008 | Hopmann et al. |
| 2008/0052384 A1 | 2/2008 | Marl et al. |
| 2008/0065760 A1 | 3/2008 | Damm et al. |
| 2008/0070603 A1 | 3/2008 | Mao |
| 2008/0134164 A1 | 6/2008 | Stich et al. |
| 2008/0243699 A1 | 10/2008 | Hilerio et al. |
| 2009/0017832 A1 | 1/2009 | Tebbs et al. |
| 2009/0019141 A1 | 1/2009 | Bush et al. |
| 2009/0019147 A1 | 1/2009 | Ahlers et al. |
| 2009/0019314 A1 | 1/2009 | Younger et al. |
| 2009/0052338 A1 | 2/2009 | Kelley et al. |
| 2009/0055514 A1 | 2/2009 | Tebbs et al. |
| 2010/0020694 A1 | 1/2010 | Jones |

FOREIGN PATENT DOCUMENTS

| | | |
|---|---|---|
| JP | 2001-352328 A | 12/2001 |
| KR | 2004-0047209 A1 | 7/2004 |
| KR | 10-2005-0031175 A | 4/2005 |
| KR | 2005-0078541 A | 8/2005 |
| KR | 2005-0094247 A | 9/2005 |
| WO | WO 2008/156898 | 12/2008 |
| WO | WO 2009/011962 | 1/2009 |
| WO | WO 2009/011963 | 1/2009 |
| WO | WO 2009/011964 | 1/2009 |
| WO | WO 2009/011965 | 1/2009 |
| WO | WO 2009/011966 | 1/2009 |

OTHER PUBLICATIONS

U.S. Appl. No. 11/696,638, filed Apr. 4, 2007, entitled "Network Management Providing Network Health Information and Lockdown Security," Inventor(s) Steve Bush et al.

Marcia Zangrilli, et al., "Using Passive Traces of Application Traffic in a Network Monitoring System," copyright 2004 IEEE, 11 pages.

Kazuya Kubo, et al., "Hybrid Peer-to-Peer System for Network Monitoring of Field Devices," Downloaded May 14, 2009 at 10:08 from IEEE Xplore, copyright 2003 SICE, 6 pages.

International Search Report for International Application No. PCT/US2008/063335 mailed Sep. 22, 2008 (1 page).
Written Opinion of the International Searching Authority for International Application No. PCT/US2008/063335 mailed Sep. 22, 2008 (4 pages).
International Search Report for International Application No. PCT/US2008/063308 mailed Oct. 30, 2008 (2 pages).
Written Opinion of the International Searching Authority for International Application No. PCT/US2008/063308 mailed Oct. 30, 2008 (4 pages).
International Search Report for International Application No. PCT/US2008/063333 mailed Sep. 26, 2008 (2 pages).
Written Opinion of the International Searching Authority for International Application No. PCT/US2008/063333 mailed Sep. 26, 2008 (4 pages).
International Search Report for International Application No. PCT/US2008/059490 mailed Apr. 21, 2009 (2 pages).
International Preliminary Report on Patentability issued Oct. 6, 2009 (1 page) and Written Opinion of the International Searching Authority mailed Apr. 21, 2009 (3 pages) for International Application No. PCT/US2008/059490.
Notification Concerning Transmittal of International Preliminary Report on Patentability (1 page), International Preliminary Report on Patentability (1 page), and Written Report of the International Searching Authority (4 pages) mailed Jan. 28, 2010 for International Application No. PCT/US2008/063318.
Barb Bowman, "Introduction to Windows XP Service Pack 2," Published Aug. 25, 2004, 8 pages; © 2010 Microsoft Corporation http://www.microsoft.com/windowsxp/using/security/expert/bowman_introtosp2.mspx.
Microsoft TechNet, "The Cable Guy—Jun. 2004: The New Wireless Network Setup Wizard in Windows XP Service Pack 2," Published May 25, 2004; Updated Aug. 4, 2004, 10 pages; © 2010 Microsoft Corporation; http://technet.microsoft.com/en-us/library/bb878069.aspx.
Microsoft Corporation, "Windows Connect Now-UFD for Windows XP Specification," © 2010, Updated Sep. 15, 2006, 1 page; http://www.microsoft.com/whdc/connect/Rally/WCN-UFD_XPspec.mspx.
Microsoft Corporation, "Windows Connect Now-UFD for Windows XP," Version 1.1 © 2010—Sep. 15, 2006, 33 pages; http://www.microsoft.com/whdc/connect/Rally/WCN-Netspec.doc.
Microsoft Corporation, "Windows Connect Now-UFD and Windows Vista Specification," Version 1.0 © 2010—Sep. 15, 2006, 1 page; http://www.microsoft.com/whdc/connect/Rally/WCN-UFD_Vistaspec.mspx.
Microsoft Corporation, "Windows Connect Now-UFD Windows Vista" Version 1.0 © 2010—Sep. 15, 2006, 28 pages; http://www.microsoft.com/whdc/connect/Rally/WCN-UFD_Vistaspec.doc.
Microsoft Corporation, "Windows Connect Now—Access Point has No USB Port in Wireless Networking," © 2010, printed Mar. 24, 2010, 2 pages; http://www.microsoft.com/communities/newsgroups/en-us/default.aspx?dg=microsoft.public.windows.networking.wireless&tid=c55b567e-fec3-43be-8bd1-a3216125c7f9&cat=en_US_d02fc761-3f6b-402c-82f6-ba1a8875c1a7&lang=en&cr=&sloc=en-us&m=1&p=1.
Flip Video, "Quick Start Guide: FlipshareTV," © 2009 Cisco Systems, Inc., 19 pages; http://www.theflip.com/pdf/en-US/FlipShareTVQuickStartGuide.pdf.
"Wi-Fi Certified™ for Wi-Fi Protected Setup™: Easing the User Experience for Home and Small Office Wi-Fi® Networks," © 2007, 14 pages; http://www.wi-fi.org/files/kc/20090123_Wi-Fi_Protected_Setup.pdf.
"Cisco Access Router USB Flash Memory Module and USB eToken Hardware Installation Guide," © 2006 Cisco Systems, Inc., 12 pages; https://www.cisco.com/en/US/docs/routers/access/2800/hardware/notes/mithril.html.
WiFi Alliance, "Wi-Fi Protected Setup Specification", Version 1.0h, Dec. 2006, 100 pages.
"Wi-Fi Alliance™ for Wi-Fi Protected Setup Specification," Version 1.0h, Dec. 2006, 110 pages.
Byoung-Koo Kim/Jong-Su Jang/Tai M. Chung, Design of Network Security Control System for Cooperative Intrusion Detection, 2002, pp. 389-398.
International Preliminary Report on Patentability issued Jan. 19, 2010 (1 page) and Written Opinion of the International Searching Authority mailed Oct. 30, 2008 (4 pages) for International Application No. PCT/US2008/063308.
International Preliminary Report on Patentability issued Jan. 19, 2010 (1 page) and Written Opinion of the International Searching Authority mailed Sep. 26, 2008 (4 pages) for International Application No. PCT/US2008/063333.
International Preliminary Report on Patentability issued Jan. 19, 2010 (1 page) and Written Opinion of the International Searching Authority mailed Sep. 22, 2008 (4 pages) for International Application No. PCT/US2008/063335.

* cited by examiner

SERVICE LICENSING AND MAINTENANCE FOR NETWORKS

FIELD OF THE INVENTION

The present invention is directed toward the unique identification of a network. Various aspects of the invention are particularly suitable for licensing services to a small network and for managing the gateway device for a small network.

BACKGROUND OF THE INVENTION

Computers have become commonplace tools in modern society, and many businesses and residences now have one or more computing devices. In a small business, for example, some employees may each use a desktop computer or laptop computer. Some employees may even use more portable computers such as personal digital assistants or "smart" wireless telephones. Similarly, with a family sharing a residence, each family member may have his or her personal computer, or the family members may share one or more computers. Further, both small businesses and personal residences may include various computing appliances that incorporate or otherwise interact with computers. For example, a home residence may include a refrigerator, a "Voice over Internet Protocol" telephone, a digital music server, a digital camera, or an environmental control system that includes or interacts with a computer.

In order to optimize the use and flexibility of these computing devices, a business or family may link them together to form a small private network. Typically, each of the computing devices is connected to a router through a network adapter. The router then "routes" packets of data to and from each computing device. With this type of small private network, the router can in turn be connected to one or more larger private networks or a public networks, such as the Internet. By sending and receiving messages through the router, each networked computing device may then communicate with computing devices outside of the private network. In this arrangement, the router serves as a "gateway" device that provides a gateway to outside of the private network. In many situations, a computer user may interact with more than one such network. For example, a person using a laptop computer may join a first network at his or her employment during the day, and join a second, different network at his or her residence in the evening.

As the use of networked computing devices grows, some product developers have created products to facilitate the setup, use, and functionality of private networks. One such product is the Port Magic product from Pure Networks Corporation of Seattle, Wash. The Port Magic product, for example, allows a network user to interrogate and control the use of communication ports in a small network's router.

Because this type of product benefits an entire small network rather than just an individual computer, it often would be more appropriate to associate the usage costs for the product (such as licensing fees or a sales charge) with the network, rather than with a single computer. Accordingly, it would be desirable to create a unique identifier for a network. Moreover, as the computing devices within a network may frequently change, it would be desirable to allow any computer in the network to independently create the unique identifier. Previous techniques for generating this type of unique key have required complex collaboration between each computer on the network. Still further, it would be desirable to allow the unique identifier to be consistently created over time, regardless of the particular make up of the computing devices in the network at any particular point time.

BRIEF SUMMARY OF THE INVENTION

Advantageously, embodiments of the invention allow different computers in a network can create an identifier that uniquely identifies the network. Further, these embodiments may allow the unique identifier to be consistently created over time, regardless of the particular make up of the computing devices in the network at any particular point time. According to various embodiments of the invention, a computer within the network hosts an identification creation tool. In order to create a unique identifier for the network, the tool identifies each network adapter used by the host computer. Using this information, the tool identifies a gateway device used by the network adapter or adapters, and then determines the physical network address of that gateway device. For example, if the network is an Ethernet network, the tool will determine the media access control (MAC) address for the gateway device. The tool then creates a unique identifier for the network based upon the physical address of the gateway device.

DETAILED DESCRIPTION OF THE INVENTION

Overview

Various embodiments of the invention provide a tool for creating an identifier that uniquely identifies a network. Some embodiments of the invention may typically be incorporated into a larger application that provides service or functionality to the network. For example, a network identification creation tool may be incorporated into a billing component of a larger application, so that usage charges for the application can be associated with the network rather than with an individual computer. With these embodiments, one or more computers within the network will host an instantiation of the network identifier creation tool. In order to create a unique identifier for the network, the tool identifies each network adapter used by the host computer. Using this information, the tool identifies a gateway device used by the network adapter or adapters, which typically will be a router. The tool then determines a value uniquely associated with the gateway device, such as its physical network address. The tool then creates a unique identifier for the network based upon that unique value.

Computing Operating Environment

As noted above, various embodiments of the invention may be implemented as the execution of software instructions by a computing device, such as a programmable computer. As used herein, the term "computer" refers to a device that can be programmed to perform a number of different, unrelated functions. Examples of computers will thus include conventional desktop and laptop computers, conventional personal digital assistants, and some telephones (such as wireless "smart" telephones). The term "computing appliance" then refers to a device that is limited to primarily performing only related functions. Examples of a computing appliance may thus include, for example, printers, cameras, telephones that exchange voice information in data packets (sometimes generically referred to as "Voice over Internet Protocol (VoIP) telephones), digital video recorders, televisions, streaming media players, and digital music servers, among others. The term "computing device" is then used herein to include both computers and computing appliances.

Figure 1:
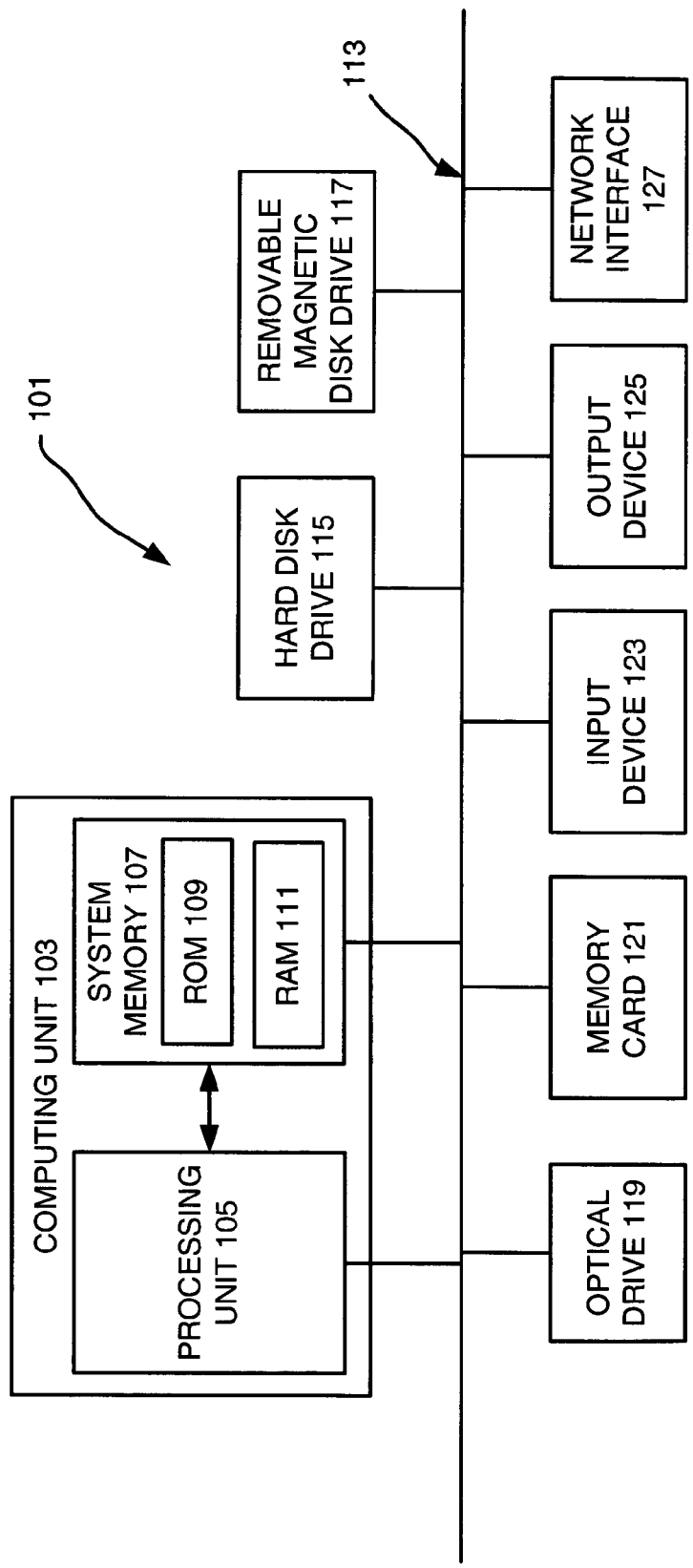
FIG. 1 illustrates an example of a computing device that may be used to implement various embodiments of the invention.

An illustrative example of such a computing device 101 is illustrated in FIG. 1. As seen in this figure, the computing device 101 has a computing unit 103. The computing unit 103 typically includes a processing unit 105 and a system memory 107. The processing unit 105 may be any type of processing device for executing software instructions, but will conventionally be a microprocessor device. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure to one or more peripheral devices. For example, the processing unit 105 or the system memory 107 may be directly or indirectly connected to additional memory storage, such as the hard disk drive 115, the removable magnetic disk drive 117, the optical disk drive 119, and the flash memory card 121. The processing unit 105 and the system memory 107 also may be directly or indirectly connected to one or more input devices 123 and one or more output devices 125. The input devices 123 may include, for example, a keyboard, a remote control pad, a pointing device (such as a mouse, touchpad, stylus, trackball, or joystick), a scanner, a camera or a microphone. The output devices 125 may include, for example, a monitor display, television, printer, stereo, or speakers.

Still further, the computing unit 103 will be directly or indirectly connected to one or more network interfaces 127 for communicating with a network. This type of network interface 127, also sometimes referred to as a network adapter or network interface card (NIC), translates data and control signals from the computing unit 103 into network messages according to a communication protocol, such as the Transmission Control Protocol (TCP), the Internet Protocol (IP), and the User Datagram Protocol (UDP). These protocols are well known in the art, and thus will not be discussed here in more detail. An interface 127 may employ any suitable connection agent for connecting to a network, including, for example, a wireless transceiver, a power line adapter, a modem, or an Ethernet connection.

Figure 2:
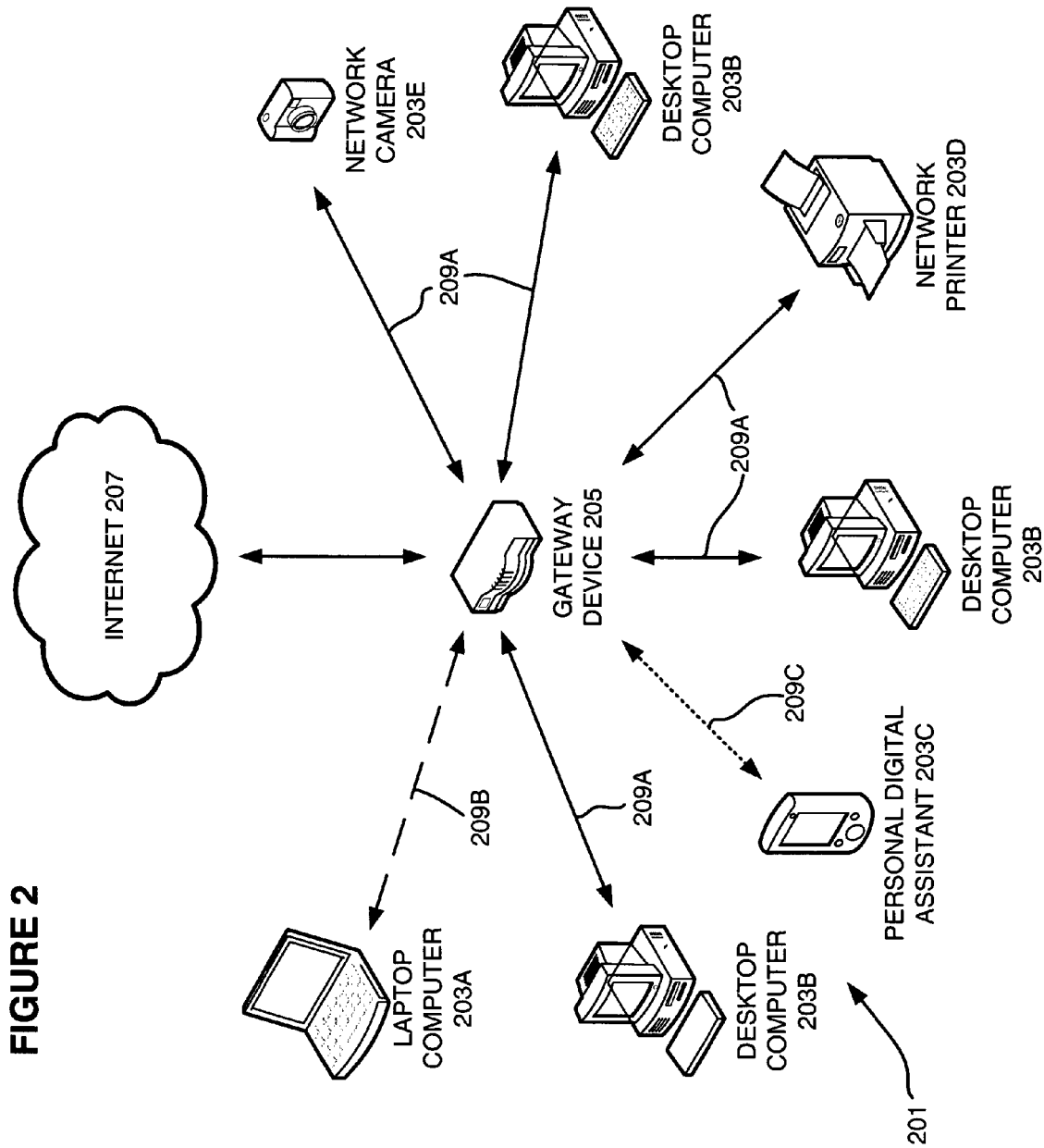
FIG. 2 illustrates an example of a network with which various embodiments of the invention may be employed.

It should be appreciated that one or more of these peripheral devices may be housed with the computing unit 103 and bus 113. Alternately or additionally, one or more of these peripheral devices may be housed separately from the computing unit 103 and bus 113, and then connected (either directly or indirectly) to the bus 113. Also, it should be appreciated that both computers and computing appliances may include any of the components illustrated in FIG. 1, may include only a subset of the components illustrated in FIG. 1, or may include an alternate combination of components, including some components that are not shown in FIG. 1.
Network Operating Environment As previously noted, various embodiments of the invention may be employed with a small network. FIG. 2 illustrates an example of this type of small network. The network 201 may include a variety of different computing devices or "nodes". For example, the network 201 may include one or more laptop computers 203A, one or more desktop computers 203B, and one or more personal digital assistants 203C. In addition to these computers, the network 201 may also include one or more computing appliances, which are not as versatile as a conventional programmable computer, but which nonetheless may be configured to exchange data over a network. Such network appliances may include, for example, one or more printers 203D and one or more cameras 203E, as illustrated in FIG. 2. Other small networks that can be used with various embodiments of the invention may include any suitable computing device, such as telephones that exchange voice information in data packets (sometimes generically referred to as "Voice over Internet Protocol (VoIP) telephones), digital video recorders, televisions, streaming media players, and digital music servers, among others.

Each of these networked devices 203 communicates, either directly or indirectly, with a gateway device 205. In turn, the gateway device 205 typically will communicate with an external device or network. An external network may be another private network, or it may be a public network, such as the Internet 207. Thus, a gateway device is a device that can steer electronic data from one network to another network. Typically, a gateway device serves as a node on two incompatible networks (i.e., networks that use different communication protocol formats) and it will convert data from one network's communication protocol format into the other network's communication protocol format. As used herein, the term "small network" refers to a network made up of networked devices that each employ the same network address to communicate with the same gateway device, together with the gateway device itself.

The network devices 203 may be connected to the gateway device 205 using any suitable communication medium. For example, in the illustrated network 201, the desktop computers 203B are connected to the gateway device 205 through a hard-wired connection 209A (such as an Ethernet cable), while the laptop computer 209B is connected to the gateway device 205 through a IEEE 802.11 wireless connection and the personal digital assistant 203C is connected to the gateway device 205 through a Bluetooth wireless connection.

It should be appreciated that, as used throughout this application, the term "connect" and its derivatives (e.g., connection, connected, connects) includes both direct and indirect connections. Thus, with the network illustrated in FIG. 2, the laptop computer 203A may be connected to the gateway device 205 using a wireless transceiver incorporated into the laptop computer 203A and a wireless transceiver incorporated into the gateway device 205. Alternately, the laptop computer 203A may be connected to the gateway device 205 using a wireless transceiver external to the laptop computer 203, the gateway device 205, or both.

Typically, the gateway device 205 will be a router. As will be appreciated by those of ordinary skill in the art, a router routes data packets from the networked devices 203 to an external device or network. With some networks, however, the gateway device 205 alternately may be a computer performing router functions, a hub, a bridge, or "layer-3" switch. As will also be appreciated by those of ordinary skill in the art, the computing devices or "nodes" making up the network 101 will communicate with the gateway device 205 using one or more defined communication protocols, such as the Transmission Control Protocol (TCP) and the Internet Protocol (IP).

With these communication protocols, each computing device 203 and gateway device 205 in the network 201 will be assigned a logical address. For example, if the network 201 is connected to the Internet 207 through an Internet service provider, the Internet service provider will assign the gateway device 205 a logical Internet Protocol (IP) address. The Internet service provider may also provide the gateway device 205 with a block of logical Internet Protocol (IP) addresses for the gateway device 205 to reassign to each network device 203. Alternatively, the gateway device 205 can itself assign a range of logical Internet Protocol (IP) addresses to each network device 203, and then use a translation operation (e.g., a Network Address Translation (NAT) operation) to route data packets that it receives to the appropriate network device 203. This type of logical address typically is unrelated to the particular computing device to which it is assigned. Instead, a logical address identifies the relationship of that computing device to other computing devices in the network.

In addition to a logical address, each network device typically will also have a physical address. For example, most computing devices capable of communicating over a network, including routers, employ a network adapter with a media access control (MAC) address. This type of physical address is assigned to a network adapter according to standards (referred to as Project 802 or just 802 standards, which are incorporated entirely herein by reference) set forth by the Institute of Electrical and Electronic Engineers (IEEE). More particularly, these standards define a 48-bit and 64-bit physical address format for network devices. The first 24 bits of the address are assigned by the IEEE Registration Authority, and uniquely identify the manufacturer of the network adapter. The remaining bits are then assigned by the manufacturer to uniquely identify each network adapter produced by the manufacturer. Consequently, the physical address of a network adapter is unique across all networks unless manually changed by the user. The physical address is unique to the network adapter, and is independent of a computing device's relationship to other computing devices in a network. Thus, the physical address does not change over time or between uses in different networks.

Application Operating Environment

Various embodiments of the invention may be incorporated as part of a larger software application. For example, some embodiments of the invention may be incorporated as a billing module within a larger software application that provides services to or enhances the functionality of a small network. Accordingly, various embodiments of the invention will now be described in the context of a component of a larger software application that may be implemented within a network, such as the small network 201.

Figure 3:
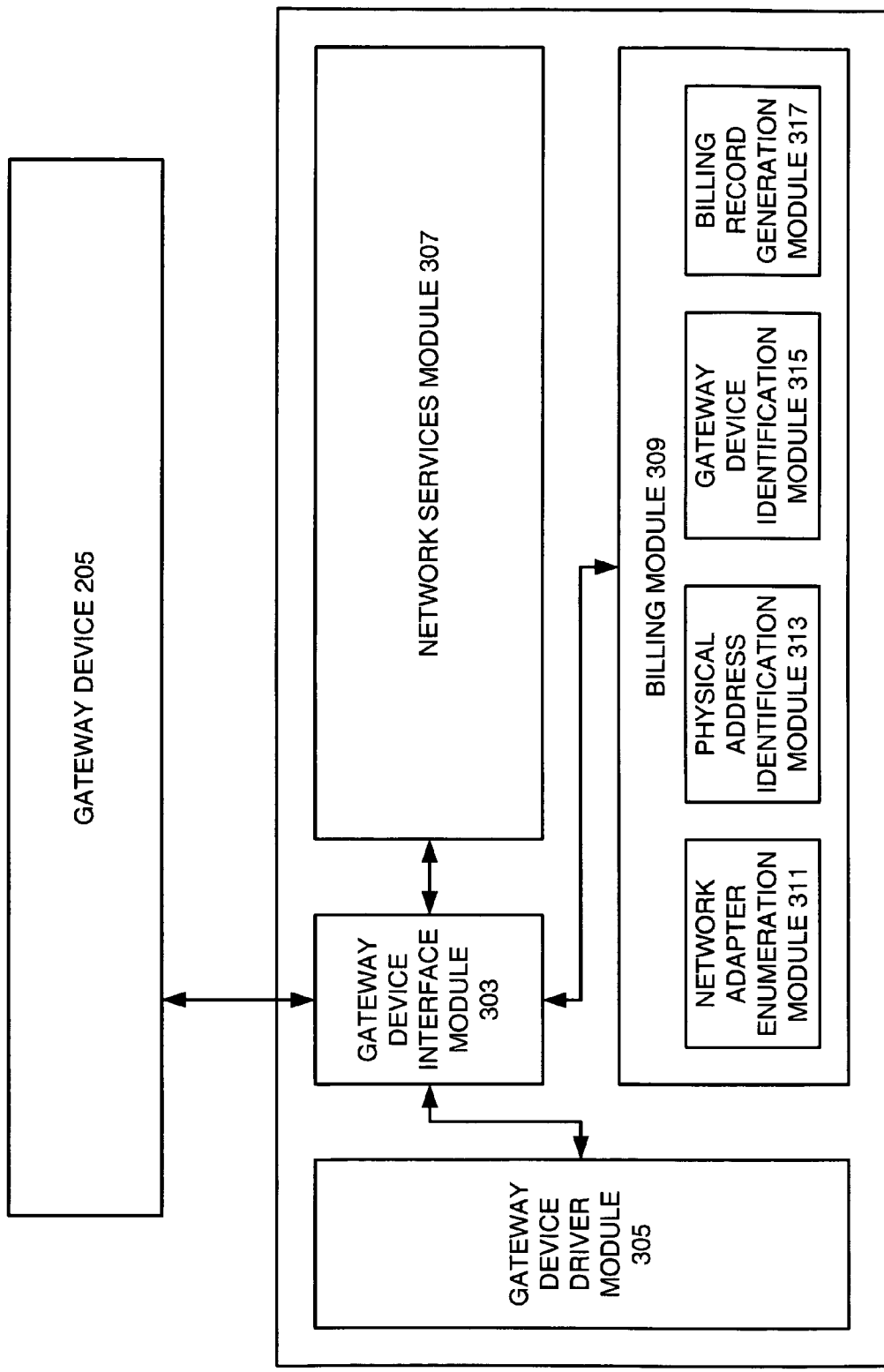
FIG. 3 illustrates an example of a software application that may employ various embodiments of the invention.

FIG. 3 illustrates a network service software application 301 for controlling communication ports on a router in a small network. As will be explained in more detail below, this type of application may incorporate various examples of the invention. As seen in this figure, the service software application 301 includes a gateway device interface module 303 and a gateway device driver module 305. The application 301 also includes a network services module 307 and a billing module 309. Each of these modules may be implemented by, for example, groups of software instructions executable by a programmable computing device. Moreover, while the modules may be implemented by the execution of software instructions on a host computing device, various embodiments of the invention also may be implemented by the storage of such software instructions on a computer-readable medium.

Returning now to FIG. 3, the gateway device interface module 305 is used to communicate with the gateway device 205. For example, the gateway device interface module 303 may include one or more application programming interfaces for controlling or otherwise communicating through a network adapter included in the computing device hosting the software application 301. While the gateway device interface module 303 is illustrated as a portion of the application 301, it should also be appreciated that, with some implementations, some portion or even all of the gateway device interface module 303 may be implemented by the operating system of the computing device hosting the network service software application 301.

The gateway device driver module 305 then provides a driver for controlling the gateway device 205. In order to allow the software application 301 to be useful for a variety of networks, the gateway device driver module 305 may employ gateway specific drivers implemented as dynamically linked libraries (DLLs) for working with a number of different gateway devices 105. With some implementations, the driver DLLs may all be included with the software application 301. With still other implementations, the gateway device driver module 305 may include an interface allowing it to use driver DLLs created by third parties. Because the gateway device 205 for a small network is almost always a router, various implementations of the software application 301 may only employ driver DLLS for routers, and omit driver DLLs for more uncommon gateway devices, such as bridges and hubs.

When the software application 301 is initiated, the gateway device driver module 305 employs heuristics to determine the appropriate driver DLL to communicate with the gateway device 205. In practice, most gateway devices implement a Web-compatible user interface accessed using the HTTP protocol for allowing a user to configure the settings and functionality of the gateway device. Accordingly, as will be described in more detail below, the software application 301 initially sends the gateway device 205 a HTTP Request. In reply, the gateway device 205 sends the software application 301 a HTTP Response containing a markup language page, such as a hypertext markup language page. That is, the HTTP Response will either include the contents of the page requested (HTTP STATUS_CODE=200) or a page containing an error message indicating the user is not authorized to view the requested page (status code "Access Denied" or 401). The gateway device driver module 305 then compares the content of the HTTP Response from the gateway device 205 with at least one corresponding regular expression registered by each driver DLL, to determine which driver DLL matches the gateway device 205.

Figure 4:
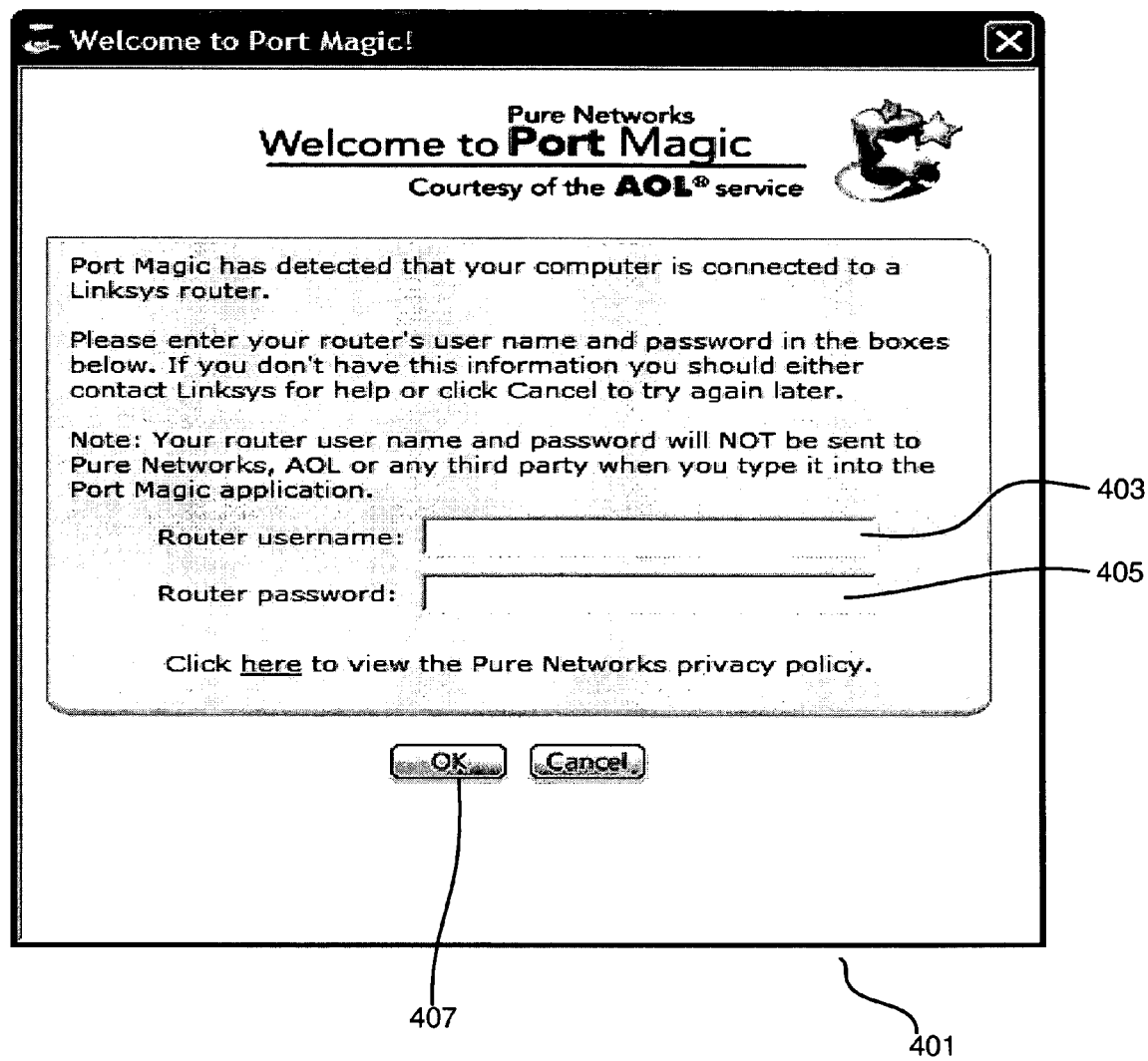
FIGS. 4-6 illustrate examples of user interfaces that may be provided by an example of a software application that may employ various embodiments of the invention.

By convention, the Web-based user interface accessed via the HTTP protocol for a gateway device typically will require a valid user name and password before allowing a user to manage the gateway device. In practice, many users do not change the user name or password from the default values configured by the manufacturer. A driver DLLs used to communicate with a gateway device 205 will thus include the original default values for the user name and password for that gateway device. These "default access credentials" then are used to communicate with gateway device 205. If the gateway device driver module 305 determines that a selected driver DLL cannot be used because these default access credential values have been changed, the software application 301 may prompt the user for the new access credential values. For example, the software application 301 may display the user interface shown in FIG. 4. As seen in this figure, the user interface 401 includes a field 403 prompting a user for the name of the router, a separate field 405 prompting the user for the router's password, and a button 405 for submitting the information in the fields 403, 405 to the software application 301. Using submitted access credential information, the driver DLL selected by the gateway device driver module 305 can control the gateway device 205.

In the illustrated example, the software application 301 controls the communication ports of the gateway device 205. Generally, the network services module 307 configures the gateway device 205 to open a port when another software application attempts to create a "listening" port on the computer device. When the other software application then seeks to close the port or exits, the network services module 307 automatically closes the port on the gateway device on behalf of the other software application. This functionality is useful, for example, with a software application that communicates in a peer-to-peer manner, such as instant messaging service applications. Without ports on the local gateway device 205 being mapped to the computing device hosting the software application, the application is forced to communicate with other computing devices 203 residing in a different network through a third computing device (typically referred to as a "relay server") outside of the small network 201. Both computing devices connect to the "relay server," and the relay server then routes communications between the two computing devices. By allowing the gateway device 205 to open a port at the request of these other software applications, communications between these other software applications can pass from a computing device on one small network to a computing device hosted on another small network.

Figure 5:
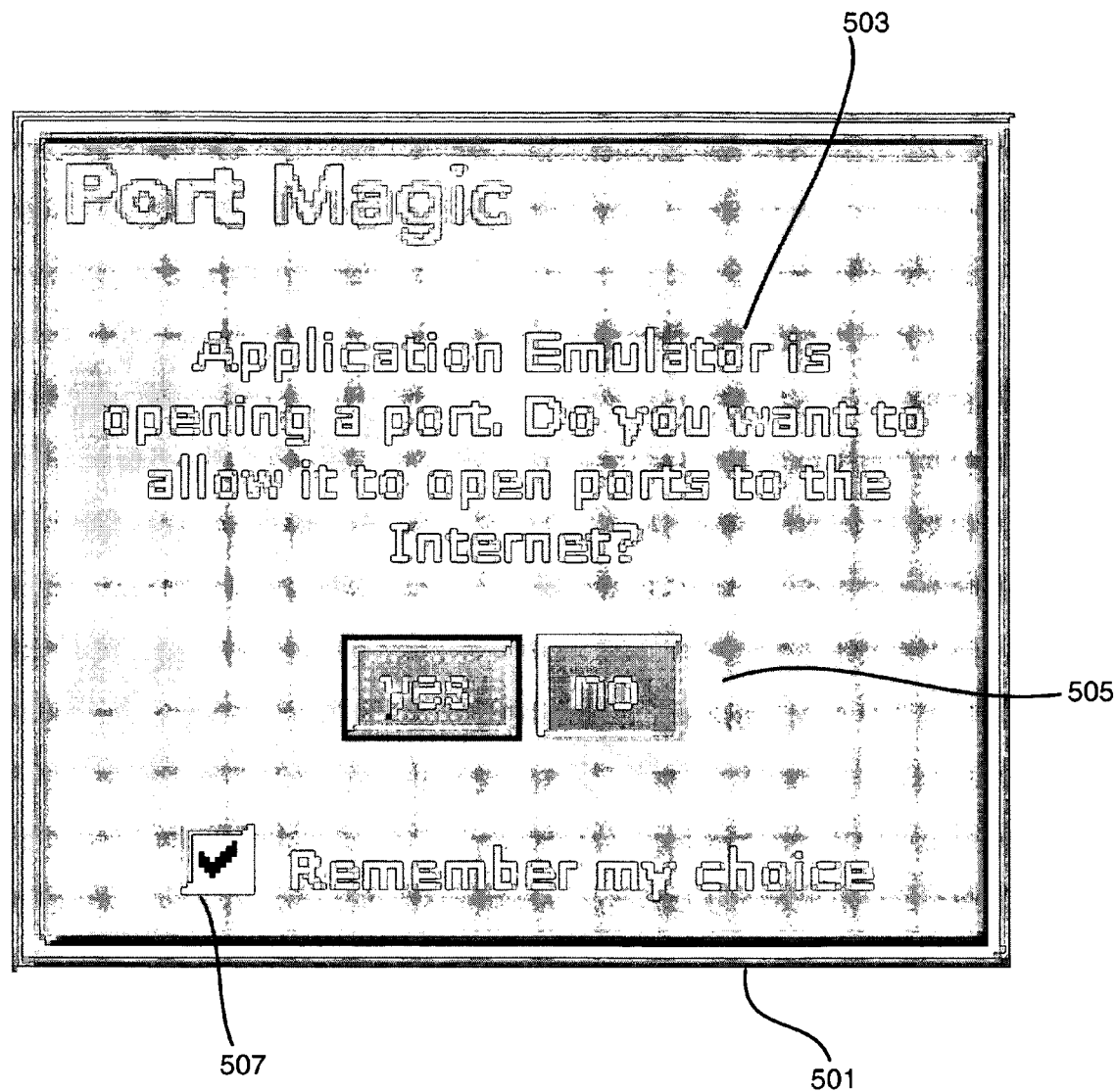

To perform these functions, the network services module 307 will "listen" for when another software application executing on the host computing device requests a communication port that can accept connections from software applications hosted on the local computing device or another computing device. For example, if the software application 301 is being implemented on a host computer using the Microsoft Windows operating system, the network services module 307 will detect when another application requests a "listening socket" in the WINSOCK layered service provider. In response to detecting such a request, the network services module 307 displays a user interface asking the user for permission to open the requested port. For example, the network services module 307 may display a user interface like that shown in FIG. 5. As seen in this figure, the user interface 501 includes a message 503 identifying the software application requesting an open communication port, and a pair of control buttons 505 that allow the user to approve or deny the request. The user interface 501 may also include a check field 507, that the user may check to make the user's response to the port request the default request response.

Figure 6:
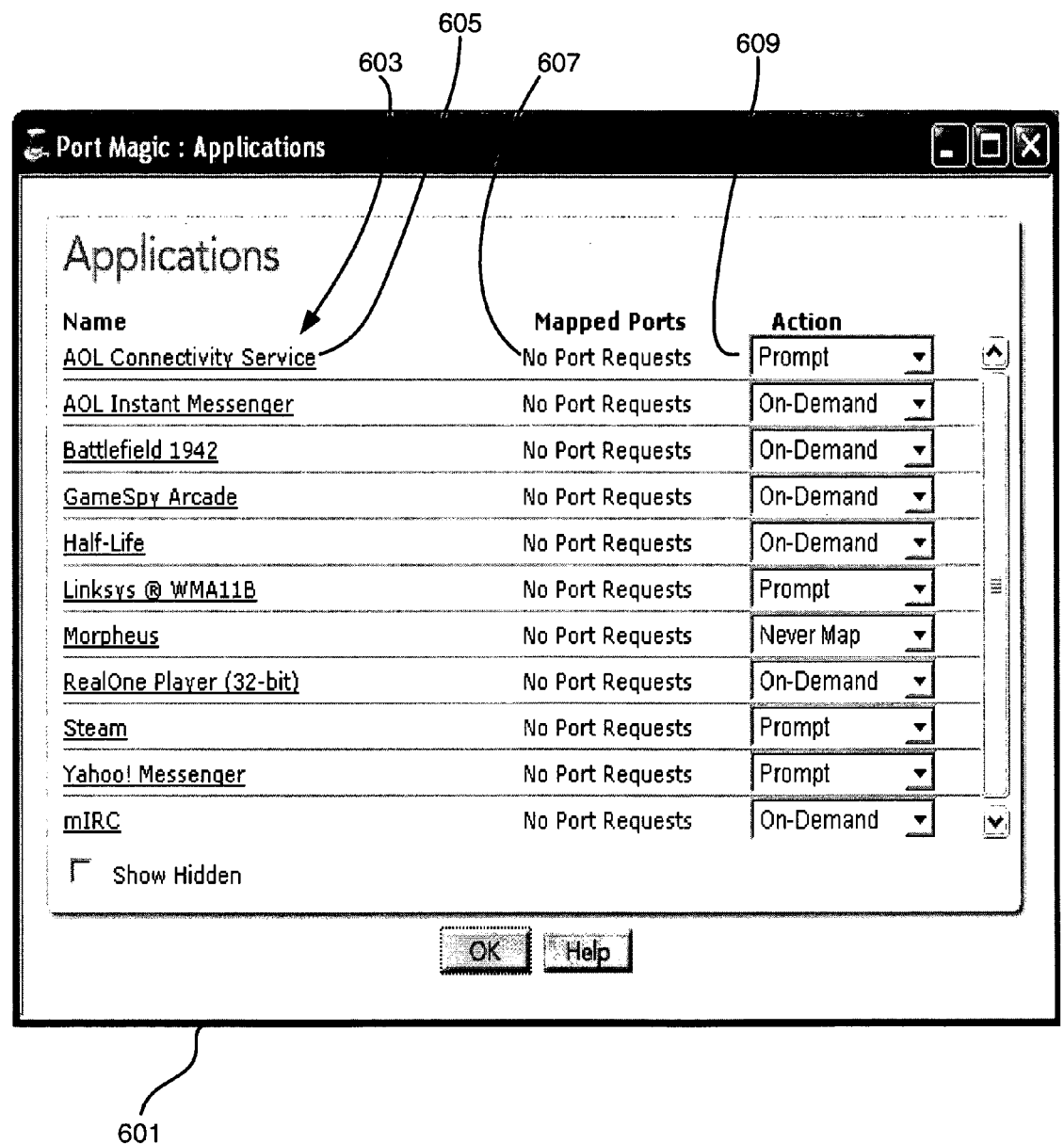

Alternately or additionally, the network services module 307 may allow a user to designate applications that are permitted to automatically open a port on the gateway device 205 without prompting the user. For example, with some implementations of the software application 301, the network services module 307 may display a user interface like the user interface 601 show in FIG. 6. As seen in this figure, the user interface 601 includes a list of applications 603 that previously have requested the opening of a communication port on the gateway device 205. Each entry in the list 603 will include a field 605 identifying the name of the application that has requested the open port, a field 607 indicating the current status of any open ports associated with the listed application, and a changeable policy field 609 designating the permissions that the application has to open ports in the future.

Thus, the list 603 of designated applications is built dynamically. When a software application requests the opening of a communication port on its hosting computing device for the first time, the network services module 307 prompts the user to designate the application port opening policy in response. With the illustrated example, the user may change the value of the field 607 to instruct the network services module 307 to (1) never map a port for the application, (2) always prompt the user for further instructions before mapping a port for the application, (3) always open the port on at the request or demand of the application, or (4) always open a port for the application when the software application 301 starts up, regardless of status of associated application. Of course, alternate implementations of the software application 301 may offer the user a finer or coarser level of control over the opening of ports on the gateway device 205.

Because the functionality provided by the network services module 307 relates to the operation of the network 201, it would often be useful to associate the usage costs of the software application 301 with the network 201, rather than with the computing device actually hosting the software application 301. Accordingly, the billing module 309 of the software application 301 may incorporate a tool according to various embodiments of the invention for creating an identifier that uniquely identifies the network 201. Moreover, the tool according to some embodiments of the invention may create billing records that include the unique network identifier and various desired usage information. In the illustrated embodiment, the billing module 309 includes a network adapter enumeration module 311, a physical address identification module 313, an optional gateway device identification module 315, and a billing record generation module 317, which incorporates a network identifier generation module as explained in more detail below.

Unique Network Identifier Tool

Figure 7A:
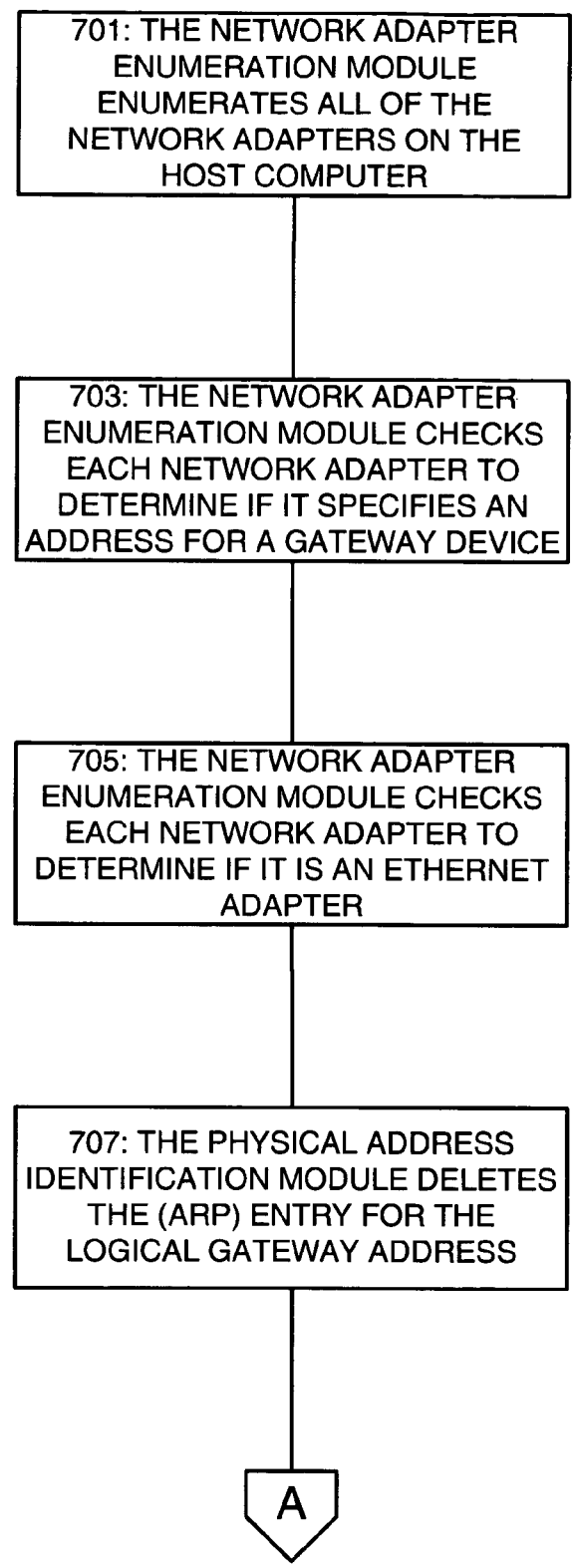
FIGS. 7A-7C illustrate a flowchart describing the operation of various embodiments of invention.
Figure 7B:
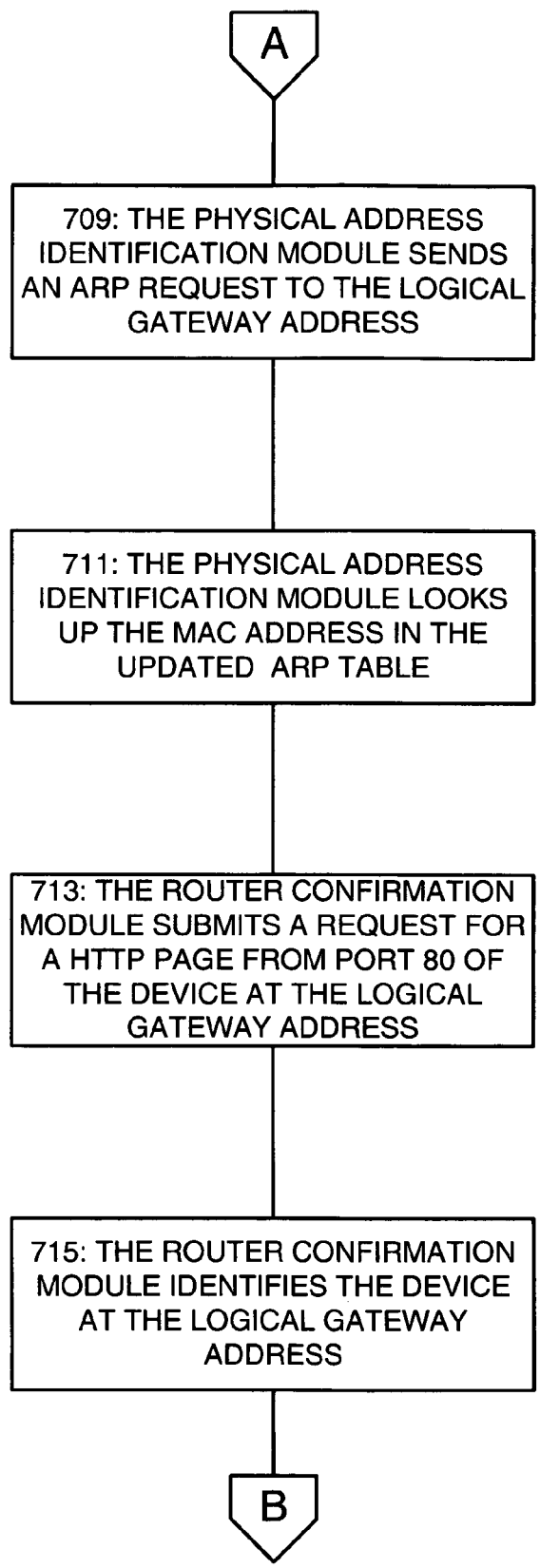
Figure 7C:
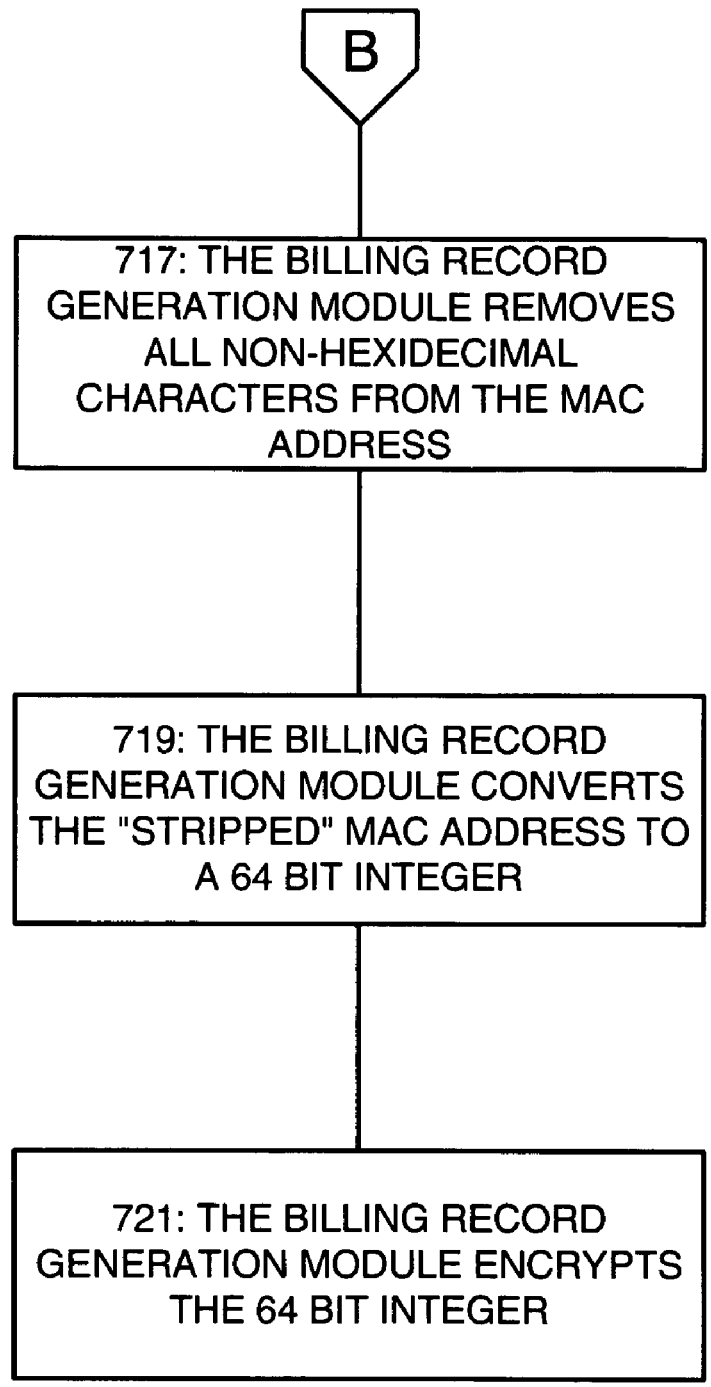

With the illustrated example, a user is charged a license fee for use of the software application 301 based primarily upon the number of networks in which the software application 301 is employed. Accordingly, the billing module 309 records each network with which the software application 301 is used. In order to do so, the billing module 309 creates a unique identifier for each network using a value uniquely associated with the gateway device 205 for that network. With various embodiments of the invention, any suitable unique identifier associated with the network's gateway device 205 may be used. Various embodiments of the invention, however, may employ the physical address of the gateway device 205 as its unique identifier. More particularly, some embodiments of the invention will use the media access control (MAC) address for the gateway device 205 as its unique identifier. Accordingly, one process by which the billing module 309 can determine a unique network identifier from the media access control (MAC) address of the network's gateway device 205 will now be described in detail with respect to FIGS. 7A-7C.

Initially, in step 701, the network adapter enumeration module 311 enumerates the network settings of all of the network adapters on the computer hosting the software application 301. For example, if the software application 301 is being hosted on a computer employing the Microsoft Windows operating system, the network adapter enumeration module 311 may call the GetAdaptersInfo application programming interface to enumerate the network adapters on the host computer. Other operating systems typically will offer commands or programming interfaces that perform a similar function. Table 1 below illustrates an example of the types of network settings that may be obtained during this enumeration process. More particularly, Table 1 shows the network adapter settings output by the "ipconfig/all" command-line utility provided by the Microsoft Windows operating system.

TABLE 1

| | |
|---|---|
| Connection-specific DNS Suffix: | MyDomain.local |
| Description: | 3Com 3C920 Integrated Fast Ethernet |
| Physical Address: | 00-06-5B-EB-C8-FD |
| Dhcp Enabled: | Yes |
| Autoconfiguration Enabled: | Yes |
| IP Address: | 192.168.1.24 |
| Subnet Mask: | 255.255.255.0 |
| Default Gateway: | 192.168.1.1 |
| DHCP Server: | 192.168.1.172 |
| DNS Servers: | 192.168.1.172 |
| Primary WINS Server: | 192.168.1.172 |
| Lease Obtained: | Wednesday, August 04, 2004 5:44:47 AM |
| Lease Expires: | Thursday, August 12, 2004 5:44:47 AM |

Thus, in addition to identifying the network adapters employed by the host computer, the enumeration process also checks each network adapter in step 703 to determine if it specifies a default logical address for a gateway device. As previously noted, this "default gateway address" is the logical network address of the gateway device 205 that routes data packets from the network 201 with the computing device 203 hosting the software application 301 to another network. If a network adapter does not specify such a default logical gateway address, then that adapter is eliminated from further processing. Also, if the embodiment of the invention is compatible with a specific type of network, it may check each enumerated network adapter to confirm that it is compatible.

For example, the illustrated embodiments of the invention employ the media access control address of the gateway device 205, as previously noted. These embodiments thus are primarily used with Ethernet networks that employ this type of physical address (i.e., a network meeting the IEEE 802.3 standard). Accordingly, in step 705, the network adapter enumeration module 311 will check each enumerated network adapter in the host computer to confirm that it is an Ethernet network adapter. Any detected network adapter that is not an Ethernet adapter is eliminated from further processing.

Next, the physical address identification module 313 determines the physical address corresponding to each logical gateway address specified by the enumerated Ethernet network adapters. More particularly, in step 707, the physical address identification module 313 deletes the address resolution protocol (ARP) entry maintained by the host computer's operating system that corresponds to the logical address of the gateway device. It then sends an address resolution protocol (ARP) request message to the logical gateway address specified by the network adapter in step 709. In response to the address resolution protocol (ARP) request message, the device at the logical gateway address transmits its physical network address (i.e., its media access control (MAC) address) to the host computer, which creates a new address resolution protocol (ARP) table entry for the gateway's physical network address. In step 711, the physical address identification module 313 then uses the address resolution protocol (ARP) table to look up the media access control (MAC) address for the device at the logical gateway address. If the retrieved media access control (MAC) address is not all zeros, the physical address identification module 313 will save the retrieved media access control (MAC) address.

With various embodiments of the invention, the network services module 307 may be configured primarily for use with small networks that employ a router as the gateway device 205, rather than another computer, a bridge, or a hub. Accordingly, rather than trying to specifically identify the type of device located at the default logical gateway address, various embodiments of the invention may optionally check to determine if the device at the default logical gateway address is a router. If it is not, then the device is assumed not to be the gateway device 205 for the network. It should be noted, however, that other embodiments of the invention may be employed with any type of gateway device 205, particularly with regard to the creation of a unique identifier for a network.

With some embodiments of the invention configured to operate primarily with a router, after the physical address identification module 313 identifies the media access control (MAC) address for the device at the default logical gateway address, the gateway device identification module 315 tests the device to determine whether it is a router and what type of router. More particularly, in step 713, the gateway device identification module 315 tries to connect to Port 80 of the device at the default logical gateway address. If the device at the default logical gateway address allows the gateway device identification module 315 to connect to its Port 80, then the router identification module will conclude that the device at the default logical gateway address hosts a Web server (i.e., provides an HTTP based interface) and is therefore most likely a router.

Next, the gateway device identification module 315 will try to identify the type of gateway device 205 at the default gateway address in order to determine which device-specific driver DLL should be used with the gateway device 205. First, the gateway device identification module 315 submits a request for a hypertext transfer protocol (HTTP) page from Port 80 of the gateway device 205. This HTTP request will include a universal resource locator (URL) address of the form "http://xxxx.xxxx.xxxx.xxxx" where "xxxx.xxxx.xxxx.xxxx" is the default gateway address for the gateway device 205. Because the gateway device 205 has not yet been identified however, this request is submitted with intentionally incorrect security credential information, as will be explained below.

Conventionally, a Web server hosted on the gateway device 205 will respond to a HTTP Request with the resource associated with the URL contained in the HTTP Request. As also known in the art, gateway devices, such as routers, conventionally employ HTML pages as their native communication format. Accordingly, the gateway device 205 may respond with an HTTP STATUS OK code message (e.g., Status_Code 200) and an HTML page associated with the gateway device 205 (e.g., the gateway device's home page). Table 2 contains an example of a Status Code OK (200) from a D-Link router:

TABLE 2

STATUS_CODE: 200
STATUS_TEXT: OK
VERSION:HTTP/1.1
SERVER: Embedded HTTP Server 2.42
Content-Type: text/html
Last-Modified: Wed, 31 Mar 2004 00:12:49 GMT
Connection: close
<HTML>
   <HTML Content of Requested Page>
</HTML>

Alternately, if the gateway device 205 employs a security authentication scheme, such as the well-known "Basic Authentication" scheme, the gateway device 205 may return an HTTP ACCESS DENIED status code message (e.g., STATUS_CODE=401). To ensure that this type of response is received for a gateway device 205 employing a security authentication scheme, the original HTTP request is submitted with intentionally incorrect security credential information, as noted above. The HTTP ACCESS DENIED status code message will typically contain the authentication scheme and "realm" for the gateway device 205. For example, Table 3 contains an "Access Denied" HTTP response from a D-Link router, model DI-624. The authentication scheme is "WWW-Authenticate: Basic" with a realm of "DI-624".

TABLE 3

STATUS_CODE: 401
STATUS_TEXT: Unauthorized
VERSION: HTTP/1.1
RAW_HEADERS_CRLF: HTTP/1.1 401 Unauthorized
Server: Embedded HTTP Server 2.42
WWW-Authenticate: Basic realm="DI-624"
Connection: close
<HTML><HEAD><TITLE>401 Unauthorized</TITLE></HEAD>
<BODY BGCOLOR="190 ffffff"><H4>401
Unauthorized</H4></BODY></HTML>
EOF As previously noted, the gateway device driver module 305 will have a number of gateway device specific driver DLLs, so that the software application 301 can operate with a wide variety of gateway devices. Each driver DLL will have one or more regular expressions associated with it, which are used to associate a driver DLL with a specific gateway device it supports. More specifically, a driver DLL for a particular gateway device will be associated with at least one regular expression corresponding to identifying information that can be obtained from that gateway device. The regular expression may correspond, e.g. to identifying information provided by the gateway device 205 in response to a routine inquiry from the computer hosting the software application 301, such as the address resolution protocol (ARP) request discussed above. Alternately or additionally, the regular expression may correspond to identifying information provided in response to a specific inquiry from the software application 301, such as the HTTP Request to the gateway device 205 also described above. As will be appreciated by those of ordinary skill in the art, a regular expression is a pattern that can match various text strings. Thus, the regular expression '1[0-9]+ will match any string with a '1' followed by one or more digits. Accordingly, the gateway device identification module 315 will compare the regular expressions associated with the driver DLLs to the identifying information obtained from the gateway device 205.

With some embodiments of the invention that employ a Microsoft Windows operating system, the regular expressions for each driver DLL may be stored as a Windows Registry Key in the Window Registry. As will be appreciated by those of ordinary skill in the art, the Windows Registry serves as a known, centralized location for storing setting information, and thus provides a convenient and accessible location for storing the regular expressions associated with each driver DLL. For example, with some embodiments of the invention a Windows Registry Key for a driver DLL will contain five entries: (1) a path entry, which specifies a fully qualified path to DLL implementing the driver for the associated gateway device, (2) a key entry that is used to sort router DLLs for evaluation order, (3) a "BasicAuth" entry that is a regular expression for evaluating the identity of the gateway device 205 when the gateway device 205 has provided an HTTP_ACCESS_DENIED response, (4) a "NoAuth" entry that is a regular expression for evaluating the identity of the gateway device 205 when the gateway device 205 has provided a HTTP_STATUS_OK response that contains the requested web page, and (5) a MAC entry that is a regular expression for evaluating the MAC address obtained from the gateway device 205 to associate the gateway device 205 with a vendor. An example of a Windows Registry Key for driver DLL to be used with a D-Link router is shown below in Table 4.

TABLE 4

[HKEY_LOCAL_MACHINE\SOFTWARE\Pure Networks\Port Magic\RG\3\DLink.dll]
"Path"="C:\\Program Files\\Pure Networks\\Port Magic\\RG\\DLink.dll"
"Key"="Dlink"
"BasicAuth"="^{DI-\\a+}|{D-Link DI-\\a+}|{Login as admin}"
"NoAuth"="{D-Link}|{NAME=\"fLogo\"}"
"Mac"="^{00:40:05}|{00:05:5D}|{00:50:BA}|{00:80:C8}"

With some embodiments of the invention, the HTTP Response returned by the gateway device 205 (i.e., either the HTML page returned with the HTTP ACCESS OK message or the HTTP ACCESS DENIED message) will be evaluated against the set of regular expressions for all of the driver DLLs (i.e., the combination of the regular expressions for all of the driver DLLs). For example, with some embodiments of the invention, the gateway device identification module 315 will first compare the contents of the HTTP reply message from the gateway device 205 with a set containing the "BasicAuth" and "NoAuth" regular expression for each driver DLL.

If a portion of the returned message (e.g., identifying information for the gateway device 205) matches a regular expression in the set, then that portion is designated as a Device Identifier value. If no portion of the returned message matches a regular expression in the set, however, then the gateway device identification module 315 will next compare the MAC address obtained for the gateway device 205 with a set containing the "MAC" regular expression associated for each the driver DLL. If the MAC address matches one of a "MAC" regular expression associated with one of the driver DLLs, that matching value is designated as the Device Identifier value. The gateway device driver module 305 can then use this Device Identifier to determine which driver DLL should be used with the gateway device 205. It should be noted, however, that alternate embodiments of the invention may compare the "MAC" regular expressions before comparing the "Basic Auth" and "NoAuth" regular expressions, or may combine the different types of regular expressions into a single comparison process.

If no identifying information obtained from the gateway device 205 matches a regular expression associated with a driver DLL, then the gateway device identification module 315 may eliminate that gateway device from consideration as a gateway device 205. Steps 707-715 are then repeated for each of the remaining enumerated network adapters for the host computer.

As noted above, various embodiments of the invention may be intended for use with small networks. Because this type of network will only include a single gateway device 205, these embodiments of the invention may only recognize one gateway device 205 for the host computer at a time. Accordingly, with these embodiments of the invention, if two or more gateway devices are identified for the host computer at a single time, they may take no further action. Alternately, some embodiments of the invention may allow the host computer to have two or more gateway devices. These alternate embodiments of the invention may, for example, generate a unique network identifier corresponding to each gateway device for the host computer. Some embodiments of the invention may alternately allow the host computer to determine the "primary" unique network identifier for the computer when more than one unique network identifier exists. The algorithm used to make this determination could be any suitable algorithm that generates a consistent result, such as choosing the numerically lowest or highest network identifier.

Once a gateway device 205 has been validated as a supported and accessible router, the billing record generation module 317 uses the previously obtained media access control (MAC) address for that router to generate the unique network identifier for the small network. More particularly, in step 717, the billing record generation module 317 removes all non-hexidecimal characters from the MAC address. Next, in step 719, the billing record generation module 317 converts this "stripped" MAC address to a 64 bit integer. Finally, in step 721, the billing record generation module 317 encrypts the 64 bit integer. The billing record generation module 317 may, for example, use Bruce Schneier's BLOWFISH encryption algorithm, which is incorporated entirely herein or other suitable encryption algorithm for the encryption. The well-known BLOWFISH encryption algorithm, is described in, e.g., *Lecture Notes in Computer Science*, #809, Springer-Verlag, 1994, which is hereby incorporated entirely herein by reference.

Various embodiments of the invention may employ the same encryption key for every copy and instantiation of the software application 301. The resulting unique network identifiers would thus not securely encrypt the original MAC address, but they would not provide any private information identifying the user. Alternately, with some embodiments of the invention, the stripped MAC addresses may be individually and securely encrypted. Still further, some embodiments of the invention may perform alternate or additional desired manipulations of the gateway device's MAC address to generate the unique network identifier, such as embedding the MAC address (or a derivative thereof) into a larger block of information. Still further, some embodiments of the invention may even use the original MAC address for the gateway device, without modification, as the unique network identifier for the network.

Thus, the billing record generation module 317 as described above incorporates a network identifier generation module for generating a unique network identifier. It should be noted, however, that, where a network identifier is desired independently of a billing record (e.g., where a computing device's use of various networks is simply being tracked), alternate embodiments of the invention may include only the network identifier generation module portion of the billing record generation module 317.

It also should be noted that, with various embodiments of the invention, the process described in detail above may be performed each time the software application 301 is instantiated on the host computing device. Additionally, however, this process may be periodically repeated, so that the billing module 309 can promptly detect when the host computing device changes from one network to another network.

Creation of Billing Records

Once the unique network identifier has been created to uniquely identify a network, the billing record generation module 317 can use this identifier to bill for use of the software application 301. With some embodiments of the invention, a usage fee may be paid by the user to the vendor of the software application 301. With still other embodiments of the invention, however, a third party may pay the usage fee to the vendor of the software application 301. For example, if the software application 301 is used to provide some functionality related to a third party, such as access to a network site or software application provided by the third party, then the third party may pay some or all of the usage fee for use of the software application 301. It should also be appreciated that the usage fee may be a one-time purchase fee, an ongoing license or royalty fee, or some combination of both.

In the illustrated embodiment of the invention, the billing record creation module 317 periodically creates a billing record on which the usage fee will be based, and then transmits that billing record to a licensing service maintained on a remote computer. Using the information, the licensing service will bill the appropriate party. The licensing service may be maintained by the vendor for software application 301, a third party that will be billed for use of the software application, or yet another party as desired. The licensing service may be maintained by a computer on a public network, such as the Internet, or by a computer on a private network directly or indirectly accessible to the computer hosting the software application 301.

With various embodiments of the invention, the billing record creation module 317 will create and transmit a billing record on a periodic basis. Some embodiments of the invention, for example, may create a billing record approximately every 7-14 days. The initial date creation may include a randomly generated offset, to avoid having the licensing server overwhelmed by receiving a large number of billing records at the same time. With some embodiments of the invention, the billing record creation module 317 may also create and transmit a billing record upon detection of a new network (i.e., when the billing record creation module 317 creates a new network identifier). This ensures that every new network is accounted for in the billing process as soon as possible.

The billing record may include a variety of information. For example, the billing record will include the unique network identifier for the network or networks used by the computer hosting the software application 301. With some embodiments of the invention, the billing record may only include the network identifier for the network currently being used by the host computer, thereby providing current activity information. Alternately, the billing record may include a history of networks used by the host computer for the most recent period, each network being identified by its own network identifier.

The billing record may also include an identifier for each computer on network. By employing a technique similar to that used to generate the unique network identifier described, the physical or MAC address of the primary network interface for each computing device in the network 201 may be used to generate a unique identifier for each computing device. Alternatively, computer identifiers may be generated, for example, by each computer itself using, e.g., the Microsoft Windows operating system GUIDGEN facility or a similar function on an alternate operating system. This allows the licensing service to determine the average size of a particular network, by counting the number of registered computers associated with a small network identifier during the period covered by the billing record. This information also allows the licensing service to determine how often a user changes or roams between networks. The billing record may also include more specific information regarding the host computer, such as the version and current update of its operating system and the version and current update of the browser employed by the host computer to communicate over the network. Thus, if the host computer uses the Microsoft Windows operating system and the Microsoft Internet Explorer browser, the billing record may include data indicating the major and minor version of the Windows operating system, data indicating the major and minor version of the Internet Explorer browser, and the last 2 characters of Service Pack String.

Still further, the billing record may include information relating to the gateway device 205, such as its make and model and its firmware level or version. The billing record may include the build number or version of the software application 301, the date and time when the software application 301 was first installed on the host computing device, and the time and date that the billing record is being sent. The billing record may include information regarding how many port mappings are made by the gateway device (either currently or for a predetermined period of time). From this information, the licensing service can determine how actively the user employs the network.

As previously noted, the usage fees for the software application 301 may be alternately or additionally based upon the use of a service or access to a location provided by a third party. With these embodiments of the invention, the billing record will alternately or additionally include information relating to the use of the third party's product or service. For example, the billing record may include information indicating the frequency and even date and time that the host computer has used the third party's product or service.

It should be noted that, with various embodiments of the invention, each computing device in the network that is executing a version of the software application 301 may provide a billing record to the licensing service. This redundancy helps ensure that the use of each network is properly recorded. Moreover, if the licensing fee is associated with the network rather than the host computer, only a single usage fee will be charged for each network since each host computer will independently and consistently create the same network identifier for a single network. Alternatively, the billing service can charge a usage fee, for example, based on the number of host computers connected to a single network. Thus, the usage fee may be one value when five computers are connected to the network and another value when more or less computers are connected to the network. Of course, a combination of these different usage fee criteria may also be employed.

Other Network Maintenance using the Unique Network Identifier

While various embodiments of the invention can be used to ensure that a usage fee is consistently and accurately associated with a network rather than an individual host computer, some embodiments of the invention may also be used to maintain and support a network. As discussed in detail above, the billing record provided to the licensing service may include the vendor, make, model and firmware version of the gateway device 205. In addition, however, the initial characters of the media access control address (sometimes referred to as the Organization Unit Identifier (OUI)) identify the vendor, make and model of gateway device 205. This allows the billing module 309 to identify the manufacturer of the gateway device 205, the model of the gateway device, and even the production run of the gateway device 205 using sequential MAC address numbers. Accordingly, various embodiments of the invention may use this information to more quickly and accurately select an appropriate driver DLL for use with the gateway device 205. In some cases, the MAC address can be used by embodiments of the invention to identify and download the appropriate driver on a real-time basis from a remote location, such as the licensing service. Still further, by using the MAC address to identify the make and model of the gateway devices used by the various copies of the software application 301, the vendor of the software application 301 can determine which gateway devices are most important to continue to support.

Further, the identification information in the MAC address can be used to support the operation of the gateway device and/or the network. Thus, some embodiments of the invention may use the obtained MAC address for the gateway device to determine when the gateway device will not operate as desired, or when the gateway device should have its firmware upgraded or otherwise should receive some type of maintenance. For example, some early, unsophisticated routers will reboot when mapping a new port. Thus, these routers will drop all session information for an existing connection of a software application on a host computer when a second software application on the host computer attempts to map a new port. While this occurrence is not critical for a user running a single network application, it may be very burdensome for a user running multiple network applications as the connections created by the other network applications will be dropped when the new port is mapped on the router.

To identify this problem, various embodiments of the invention may test a new gateway device. More particularly, the software application 301 will establish a connection to the DNS server specified in the "active" network adapter associated with the gateway device. Next, the software application 301 will attempt to have the gateway device map a port while the connection to the DNS server is still active. If the connection through the mapped port is dropped, then the gateway device reboots when a port is mapped and the gateway device therefore is deemed "bad."

With some embodiments of the invention, the vendor, make, model and firmware version obtained for a gateway device can be used to specifically identify the make and model of a "bad" gateway device. With still other embodiments of the invention, the portion of the MAC address corresponding to the vendor, make, model and firmware version of a gateway device can be used to specifically identify the make and model of a "bad" gateway device. This identification of "bad" and "good" gateway devices can then be added to a central location, such as the licensing service or a Web service. When an instantiation of the software application 301 detects the use of a new gateway device, it can first check that central location to determine if the gateway device is flawed. Only if there is no information in the central location will the software application 301 then need to test the gateway device 205.

Alternate Operating Environments

It should be appreciated that the various aspects of the invention can alternately or additionally be employed in wide variety of environments. Thus, while some embodiments of the invention were described with respect determining a unique identifier for a network, other embodiments of the invention may be used to generate a unique identifier for any computing device. For example, some embodiments the invention may obtain a physical address from another computing device that is not a gateway device for a network, such as a computer or computing appliance (e.g., a network camera, a VoIP telephone, a digital music server, etc.). These embodiments may then create an identifier based upon the obtained physical address (e.g., such as a media access control (MAC) address) that uniquely identifies the other computing device.

Still further, various embodiments of the invention may be employed to identify a computing device that is not a gateway device, such as a computer or computing appliance (e.g., a network camera, a VoIP telephone, a digital music server, etc.). More particularly, these embodiments of the invention may request identifying information from another computing device. For example, some embodiments of the invention may request an HTTP Response from anther computing device as described above, request a media access control (MAC) from another computing device as described above, or a combination of both. These embodiments of the invention will then compare the obtained identifying information with one or more sets of regular expressions to identify the other computing device. It should also be appreciated that the identity of the other computing device can then be used to, for example, identify (and, if necessary, obtain) a driver or other software application that should be employed with the identified device. The determined identity of another computing device can alternately or additionally be used to track or record usage information (e.g., location, frequency, duration, etc.) for the identified device, or to provide support for the identified device.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method of creating a unique identifier of a first network, the method comprising:
    identifying, with a first device of the first network, a gateway device of the first network;
    determining, with the first device, a value uniquely associated with the gateway device;
    creating, with the first device, a unique identifier for the network based upon the determined value, wherein the determined value is a physical address for the gateway device, and wherein identifying the gateway device for the first network includes identifying at least one network adapter employed by the first device to communicate with the gateway device, wherein the first device is configured to delete an address resolution protocol (ARP) entry maintained by an operating system of the first device and corresponding to a logical address of the gateway device, and wherein the first device is configured to communicate an ARP request message to the gateway device and to receive a media access control (MAC) address from the gateway device that is stored as a new entry in an ARP table of the first device, and wherein the determining of the value uniquely associated with the gateway device is executed only if the first device determines that the logical address of the gateway device corresponds to a router; and
    generating a billing record using the physical address, wherein the billing record includes a number of registered devices on the first network that are using an application, and wherein the first device is included in the registered devices that are using the application.

2. The method recited in claim 1, wherein the determined value is a Media Access Control address for the gateway device.

3. The method recited in claim 2, wherein the gateway device is a router.

4. The method recited in claim 1, wherein the determined value is a media access control address for the gateway device; and determining a value uniquely associated with the gateway device includes obtaining a media access control address corresponding to the gateway logical address.

5. The method recited in claim 4, wherein determining a value uniquely associated with the gateway device further includes accessing an address resolution protocol table listing the gateway device, and looking up the media access control address corresponding to the gateway logical address in the address resolution protocol table.

6. The method recited in claim 4, wherein determining a value uniquely associated with the gateway device further includes determining that the gateway device is a router.

7. The method recited in claim 1, wherein creating a unique identifier for the first network based upon the determined value includes encrypting the determined value.

8. The method recited in claim 1, wherein creating a unique identifier for the first network based upon the determined value includes compressing the determined value.

9. The method recited in claim 8, wherein creating a unique identifier for the first network based upon the determined value further includes encrypting the compressed determined value.

10. The method recited in claim 1, further comprising transmitting the unique identifier to a computer outside of the first network.

11. A computer-readable medium having computer-executable instructions for performing the method recited in claim 1.

12. A method of licensing network services to at least one device of a first network, the method comprising:
    providing a service;
    receiving a network identifier for at least one device of the first network;
    generating a billing record corresponding to the received network identifier, wherein a first device of the first network identifies a gateway device of the first network and a value uniquely associated with the gateway device is determined, and wherein the first device creates the network identifier based upon the determined value, and wherein the determined value is a physical address for the gateway device, and wherein identifying the gateway device for the first network includes identifying at least one network adapter employed by the first device to communicate with the gateway device, and wherein the billing record is generated using the physical address, wherein the billing record includes a number of registered devices on the first network that are using an application, and wherein the first device is included in the registered devices that are using the application, wherein the first device is configured to delete an address resolution protocol (ARP) entry maintained by an operating system of the first device and corresponding to a logical address of the gateway device, and wherein the first device is configured to communicate an ARP request message to the gateway device and to receive a media access control (MAC) address from the gateway device that is stored as a new entry in an ARP table of the first device, and wherein the determining of the value uniquely associated with the gateway device is executed only if the first device determines that the logical address of the gateway device corresponds to a router.

13. The method recited in claim 12, wherein providing the service to the network includes supplying a software application for use by at least one computer within the network.

14. The method recited in claim 12, further comprising: receiving usage information with the network identifier, such that the use information identifies one or more particular uses of the network; determining a charge to be included in the billing record based upon the received usage information.

15. The method recited in claim 14, further comprising: submitting the billing record to a third party associated with the one or more particular uses of the network identified by the usage information.

16. The method recited in claim 12, further comprising: submitting the billing record to a party responsible for the network.

17. A computer-readable medium having computer-executable instructions for performing the method recited in claim 12.

18. A tool for creating a unique network identifier, comprising:
a network adapter enumeration module executed by a host computer that identifies each network adapter for the host computer and any gateway address specified by each identified network adapter;
a physical address identification module executed by the host computer that determines a physical address for a gateway device corresponding to at least one gateway address specified by an identified network adapter;
a network identifier generation module that generates a unique network identifier based upon the determined physical address, wherein a first device of the first network is coupled to the modules and identifies a gateway device of the first network and a value uniquely associated with the gateway device is determined, and wherein the first device creates a unique identifier for the network based upon the determined value, and wherein the determined value is a physical address for the gateway device, and wherein identifying the gateway device for the first network includes identifying at least one network adapter employed by the first device to communicate with the gateway device, and wherein a gateway logical address is obtained and used by the network adapter; and
a billing record generation module that generates a billing record incorporating the unique network identifier, wherein the billing record includes a number of registered devices on the first network that are using an application, and wherein the first device is included in the registered devices that are using the application, wherein the first device is configured to delete an address resolution protocol (ARP) entry maintained by an operating system of the first device and corresponding to a logical address of the gateway device, and wherein the first device is configured to communicate an ARP request message to the gateway device and to receive a media access control (MAC) address from the gateway device that is stored as a new entry in an ARP table of the first device, and wherein the determining of the value uniquely associated with the gateway device is executed only if the first device determines that the logical address of the gateway device corresponds to a router.

19. The tool recited in claim 18, further comprising a gateway identification module that determines identification information identifying the gateway device corresponding to the at least one gateway address, and wherein the billing record generation module incorporates at least a portion of the identification information in the billing record.

20. The tool recited in claim 19, wherein the billing record generation module transmits the billing record to a remote computing device.

21. A tool for identifying a network receiving network services, comprising:
a network services module for providing one or more services to a network, the network services module being hosted in a host computer within the network;
a network adapter enumeration module that identifies each network adapter employed by the host computer and any gateway address specified by each identified network adapter;
a physical address identification module hosted in the host computer that determines a physical address for a gateway device in the network corresponding to at least one gateway address specified by an identified network adapter;
a network identifier generation module that generates a unique network identifier based upon the determined physical address; and
a gateway identification module that identifies the gateway device corresponding to the at least one gateway address, wherein a billing record is generated using the physical address, wherein the billing record includes a number of registered devices on the first network that are using an application, and wherein the host computer is included in the registered devices that are using the application, wherein the host device is configured to delete an address resolution protocol (ARP) entry maintained by an operating system of the host device and corresponding to a logical address of the gateway device, and wherein the host device is configured to communicate an ARP request message to the gateway device and to receive a media access control (MAC) address from the gateway device that is stored as a new entry in an ARP table of the host device, and wherein the determining of the value uniquely associated with the gateway device is executed only if the host device determines that the logical address of the gateway device corresponds to a router.

22. The tool recited in claim 21, further comprising a billing record generation module that creates a billing record incorporating the unique network identifier and usage fees for the one or more network services provided by the network services module.

23. The tool recited in claim 22, wherein the billing record generation module transmits the billing record to a remote computing device.

* * * * *